Patented Aug. 19, 1941

2,253,426

UNITED STATES PATENT OFFICE 2,253,426

METHOD FOR PRODUCING LUMINESCENT SCREENS

Kurt Heinz Graefe, Berlin, Germany

No Drawing. Application December 13, 1939, Serial No. 308,954. In Germany December 13, 1938

5 Claims. (Cl. 91—70)

Luminescent screens of oscillographs or television tubes have been manufactured hitherto by moistening the surface to be covered with the luminescent material with a solution of silicate of natrium, boric acid or a similar cement and dusting upon the viscous surface the luminous powder.

This method has the disadvantages that the cement absorbs on the one hand the cathode rays thus preventing the same to reach the deeper layers of the luminescent salt, and on the other hand the light produced by the rays. Another still more noxious disadvantage is the fact that the powder, when hitting upon the wet layer, forms into small clods so that the screen gets a rough surface and the light production is unequal in a disturbing degree.

In order to avoid the first said disadvantage it has been proposed to avoid the use of a cement in the following way: The surface of glass, mica or the like is firstly covered with a thin layer of sulphur on which the luminous salt is glued, and then the sulphur is removed by vaporising. This method shows, however, the second one of the above mentioned disadvantages because it is impossible to obtain a homogenous thin layer of sulphur by the methods hitherto known, as burning sulphide of carbon or condensing vapour of sulphur. When applying the first method (burning the vapour of sulphide of carbon) it is necessary that the blaze of the vapour touches the surface to be treated as otherwise the deposition of sulphur does not take place. It is, however, impossible to guide the blaze inside of the tube so exactly as to obtain a homogenous layer of sulphur.

According to the invention in an adapted vessel a well defined quantity of vapourised sulphide of carbon, mixed with oxygen and an indifferent gas or preferably mixed with air, is detonated. The detonation is not very rapid, the whole interior of the tube being filled with a blue flame. The resulting sulphur is precipitated in an exactly equal layer on all surfaces inside of the tube. The thickness of the layer is easily to be varied within wide limits by varying the quantity of the vapour. This possibility is very important as the thickness of the luminescent layer depends on the thickness of the sulphur layer.

The method according to the invention is not limited to the materials described above. It is, e. g., possible to replace the sulphur by selenium or to use instead of sulphide or selenide of carbon that of hydrogen or organic substances. In any case the mixture of the vapour of such substances with air or a similar dilution of oxygen must be so chosen that the combustion is imperfect.

For producing luminescent screens in cathode ray tubes the combustion is preferably carried out in the tube itself. Now the layer of sulphur (or selenium) is wiped off by means of liquid sulphide of carbon from all parts of the surfaces which are not to be made luminescent. After that a larger than sufficient quantity of the luminescent salt is brought into the vessel or tube and is by shaking distributed over the surface. The surplus of salt acts during the shaking process like emery for smoothing the adherent layer of salt. It is advantageous, after removing the surplus of salt, to fill in a quantity of very fine powder of quartz and to shake some time again for smoothing perfectly the salt layer.

After pouring the powder out of the vessel or tube the sulphur layer is removed by evaporation. At atmospheric pressure a temperature of 440° to 450° C. is required thereto, at lower pressure a lower temperature is suitable. The sulphur vapour may be washed out by means of a stream of air.

A luminescent screen manufactured according to the invention shows a perfectly even and homogenous surface. The salt powder adheres with remarkable solidity on the glass or mica. It may be that molecular rests of sulphur stick the faces of the elementary salt crystals to the surface.

I claim:

1. A method for producing a luminescent screen on a surface of glass or the like arranged inside of a vessel consisting in the steps of filling said vessel with a mixture of the vapour of a combustible compound of a solid element of the sulphur group with oxygen and an indifferent gas, in producing an incomplete combustion of said mixture in said vessel so as to obtain a thin layer of said element on the surfaces inside of said vessel, in removing said layer from all parts not to be made luminescent, in covering the remaining layer with powder of a luminescent salt by filling in the vessel a large quantity of said powder and distributing it by a shaking process, and in removing the layer of said element by evaporation.

2. A method for producing a luminescent screen on a surface of glass or the like arranged inside of a vessel consisting in the steps of filling said vessel with a mixture of the vapour of a combustible compound of a solid element of the sulphur group with oxygen and an indifferent gas, in producing an incomplete combustion of said mixture in said vessel so as to obtain a thin layer of said element on the surfaces inside of said vessel, in removing said layer from all parts not to be made luminescent, in covering the remaining layer with powder of a luminescent salt by filling in the vessel a large quantity of said powder and distributing it by a shaking process, and in removing the layer of said element by evaporation, said mixture consisting of said vapour and air in such proportion that an incomplete combustion in the form of a slow detonation is obtained.

3. A method for producing a luminescent screen on the inside of a cathode ray tube consisting in the steps of filling said tube with a mixture of the vapour of a combustible compound of a solid element of the sulphur group with oxygen and an indifferent gas, in producing an incomplete combustion of said mixture in said tube so as to obtain a thin layer of said element on the inner wall of said tube, in removing said layer from all parts not to be made luminescent, in covering the remaining layer with powder of a luminescent salt by filling in the tube a large quantity of said powder and distributing it by a shaking process, and in removing the layer of said element by evaporation.

4. A method for producing a luminescent screen on a surface of glass or the like arranged inside of a vessel consisting in the steps of filling said vessel with a mixture of the vapour of a combustible compound of a solid element of the sulphur group with oxygen and an indifferent gas, in producing an incomplete combustion of said mixture in said vessel so as to obtain a thin layer of said element on the surfaces inside of said vessel, in removing said layer from all parts not to be made luminescent, in covering the remaining layer with powder of a luminescent salt by filling in the vessel a large quantity of said powder and distributing it by a shaking process, and in removing the layer of said element by evaporation, the evaporation being accomplished by heating and evacuating said vessel.

5. A method for producing a luminescent screen on a surface of glass or the like arranged inside of a vessel consisting in the steps of filling said vessel with a mixture of the vapour of a combustible compound of a solid element of the sulphur group with oxygen and an indifferent gas, in producing an incomplete combustion of said mixture in said vessel so as to obtain a thin layer of said element on the surface inside of said vessel, in removing said layer from all parts not to be made luminescent, in covering the remaining layer with powder of a luminescent salt by filling in the vessel a large quantity of said powder and distributing it by a shaking process, and in removing the layer of said element by evaporation and by washing out the rest of the vapour with a stream of air.

KURT HEINZ GRAEFE.